Feb. 8, 1938.  E. W. CURTIS  2,107,749
APPARATUS FOR THE MANUFACTURE OF PRETZELS
Filed Nov. 7 1934   14 Sheets-Sheet 3

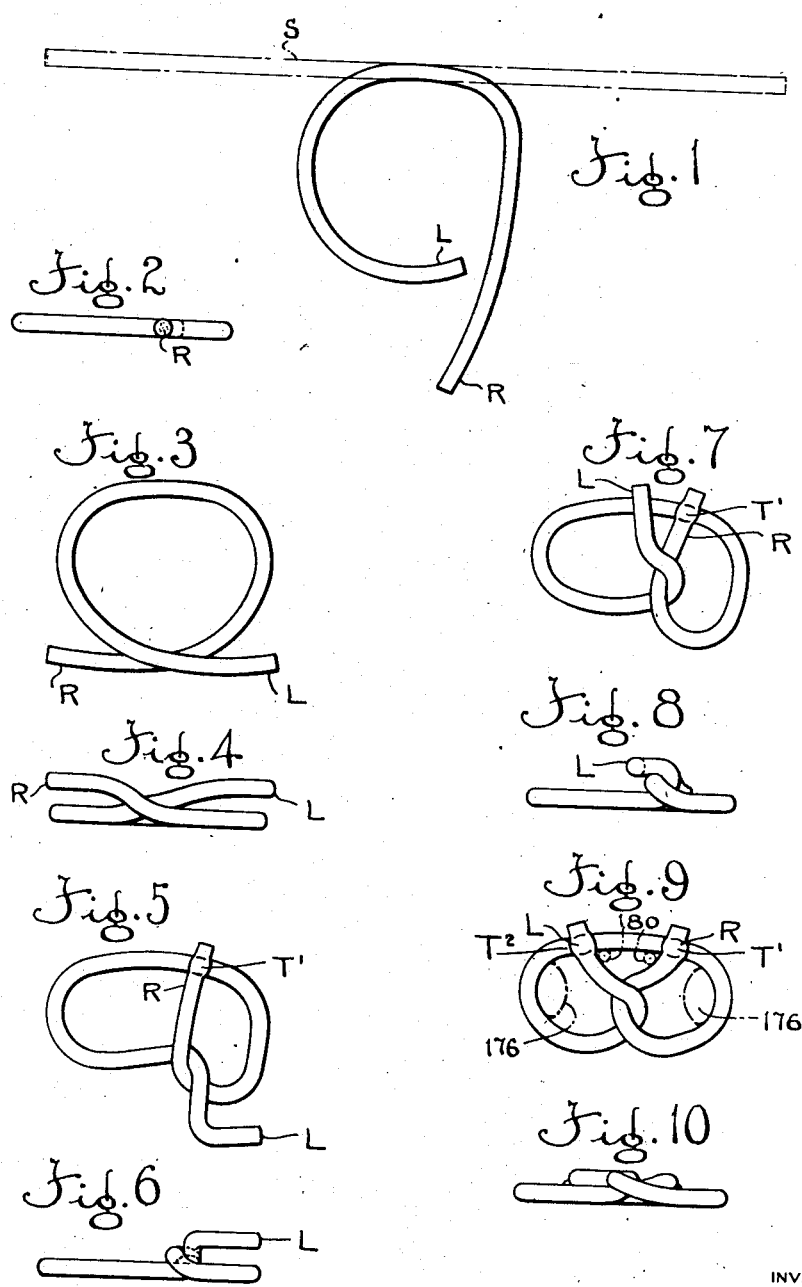

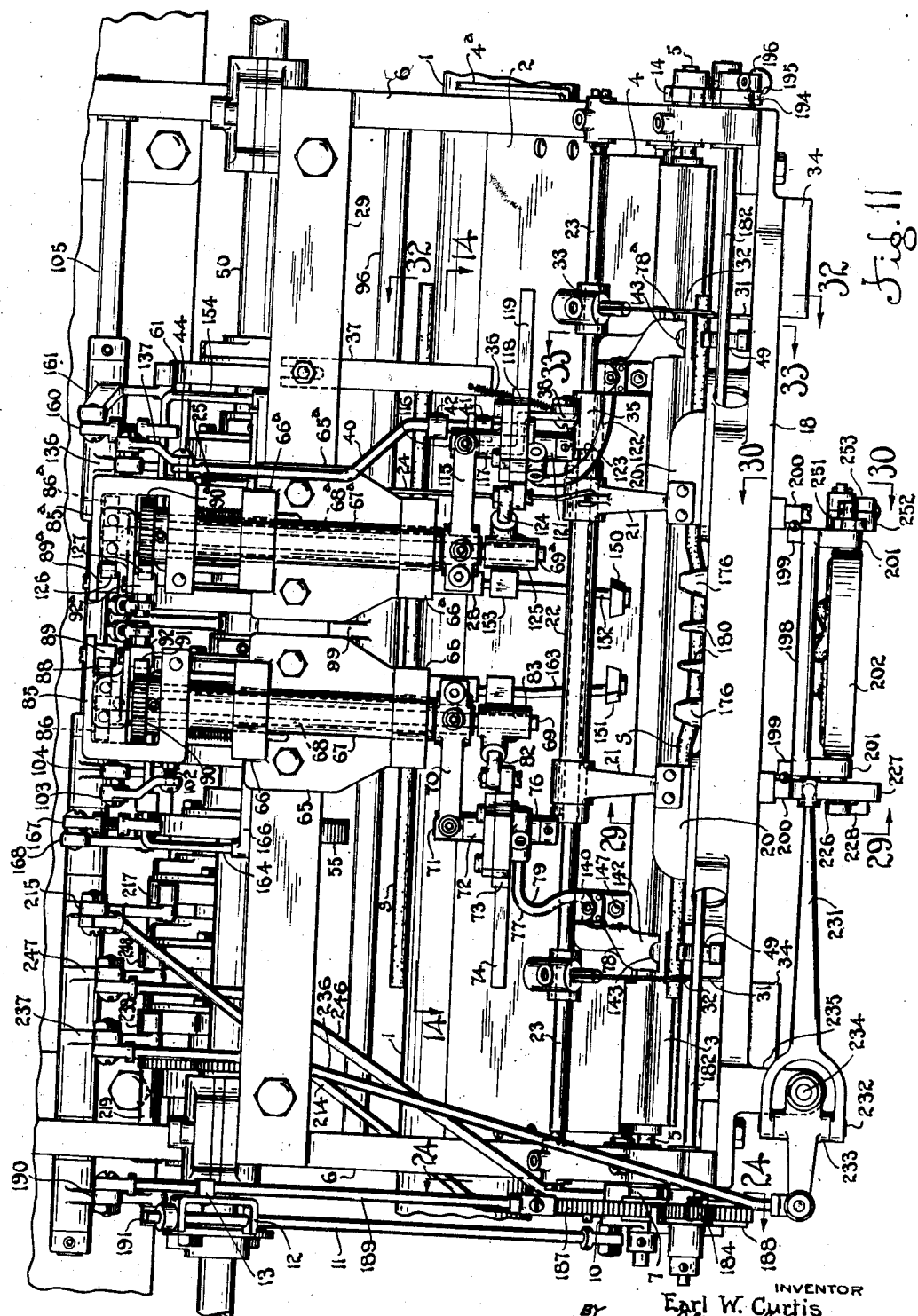

INVENTOR
Earl W. Curtis
BY Albert L. Ely
ATTORNEY

Feb. 8, 1938. E. W. CURTIS 2,107,749
APPARATUS FOR THE MANUFACTURE OF PRETZELS
Filed Nov. 7 1934 14 Sheets-Sheet 5

INVENTOR
Earl W. Curtis
BY Albert L. Ely
ATTORNEY

Feb. 8, 1938.   E. W. CURTIS   2,107,749
APPARATUS FOR THE MANUFACTURE OF PRETZELS
Filed Nov. 7 1934   14 Sheets-Sheet 6
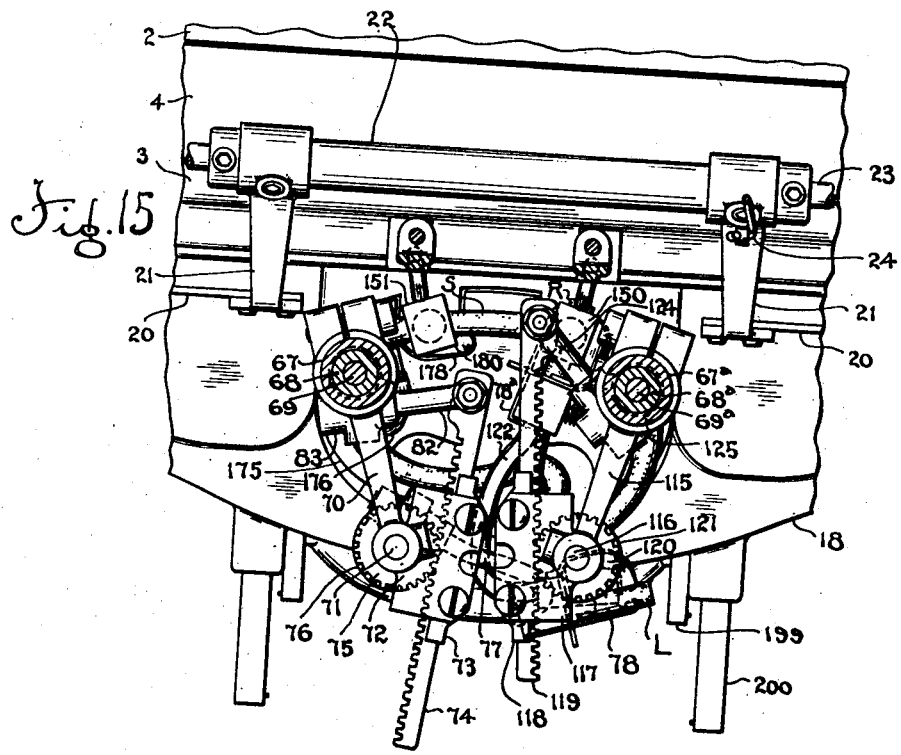
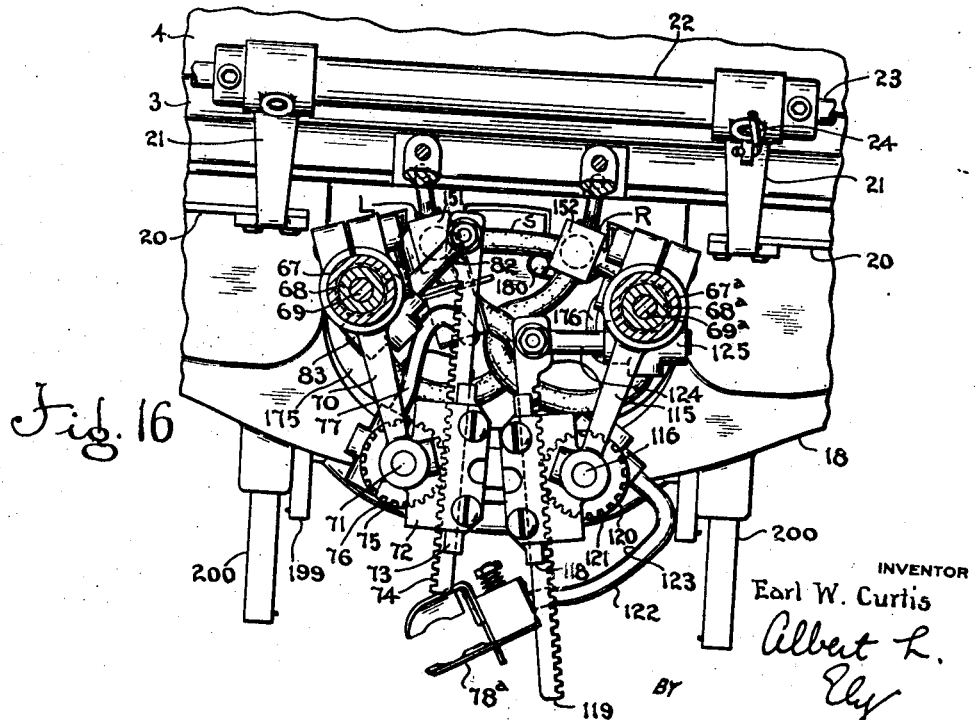
INVENTOR
Earl W. Curtis
BY Albert L. Ely
ATTORNEY

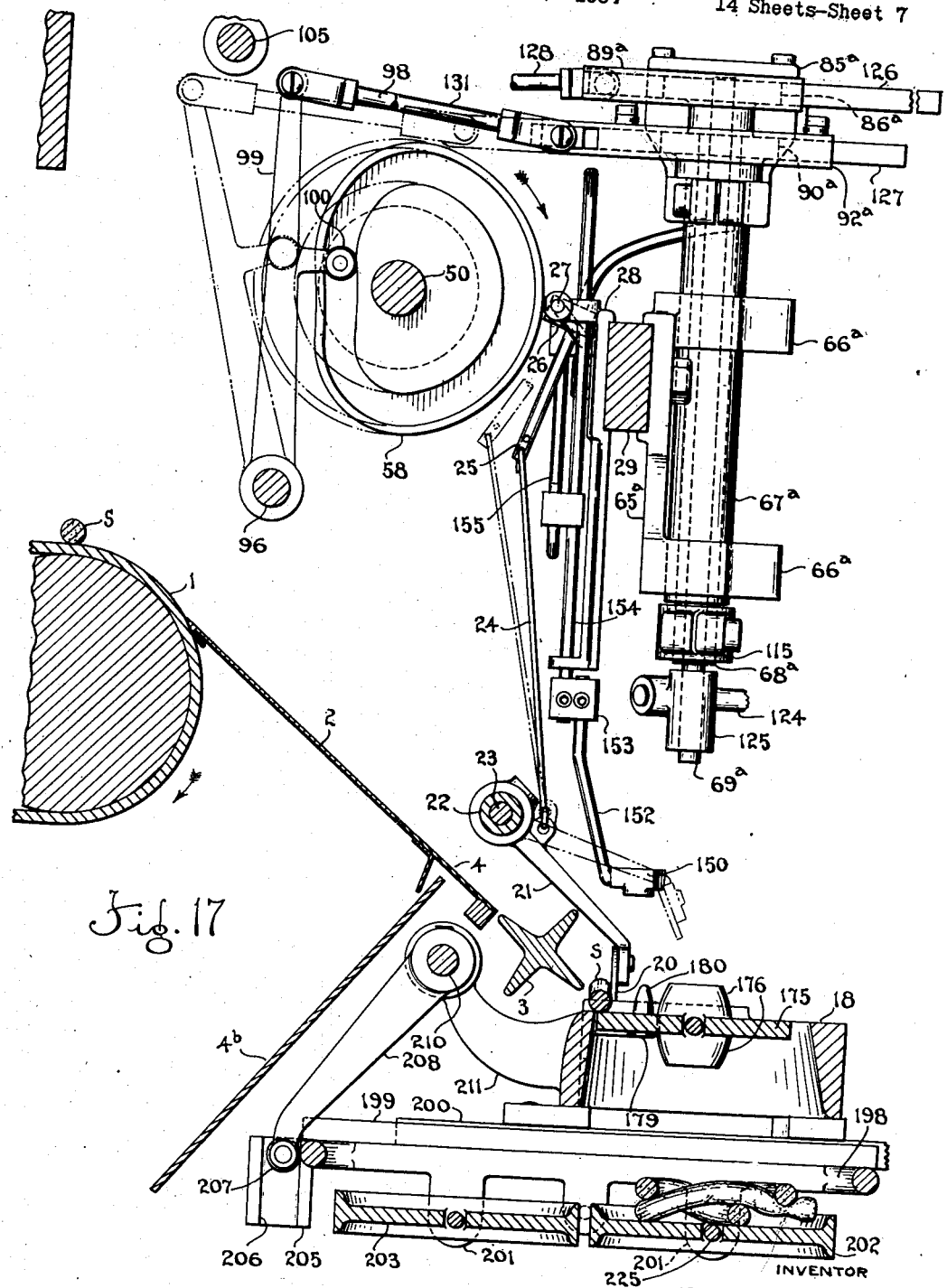

Feb. 8, 1938.  E. W. CURTIS  2,107,749
APPARATUS FOR THE MANUFACTURE OF PRETZELS
Filed Nov. 7 1934  14 Sheets-Sheet 8

INVENTOR
Earl W. Curtis
BY Albert L. Ely
ATTORNEY

Feb. 8, 1938.    E. W. CURTIS    2,107,749
APPARATUS FOR THE MANUFACTURE OF PRETZELS
Filed Nov. 7 1934    14 Sheets-Sheet 9
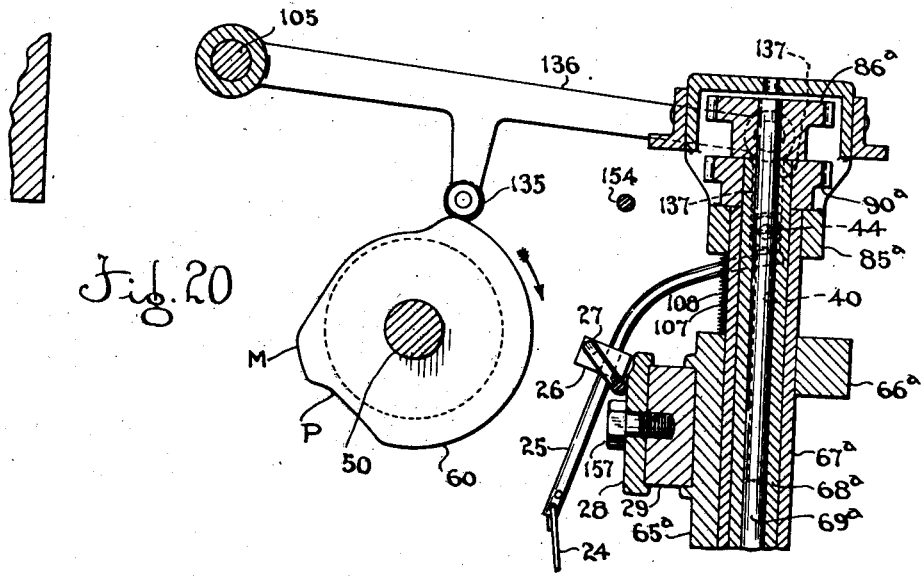
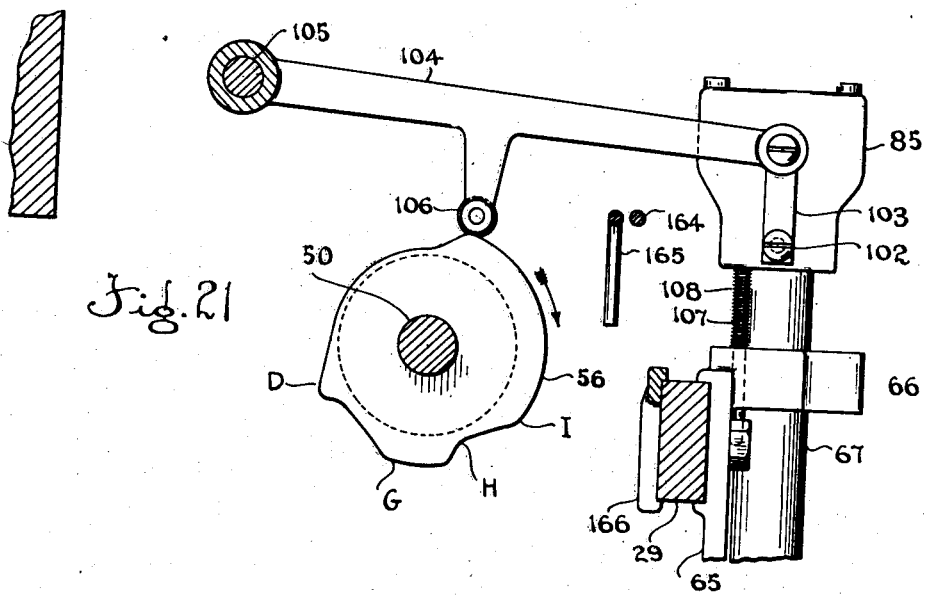
INVENTOR
Earl W. Curtis
BY
Albert L. Ely
ATTORNEY Feb. 8, 1938.   E. W. CURTIS   2,107,749
APPARATUS FOR THE MANUFACTURE OF PRETZELS
Filed Nov. 7 1934   14 Sheets-Sheet 10
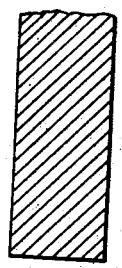
Fig. 22
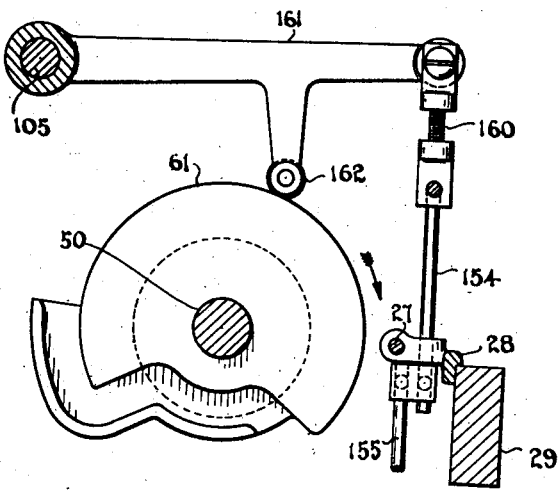
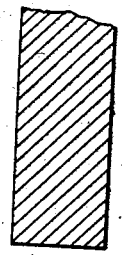
Fig. 23
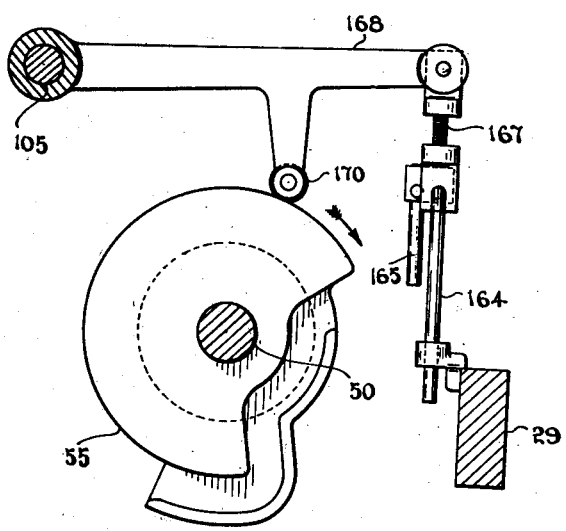
INVENTOR
Earl W. Curtis
BY
Albert L. Ely
ATTORNEY Feb. 8, 1938. E. W. CURTIS 2,107,749
APPARATUS FOR THE MANUFACTURE OF PRETZELS
Filed Nov. 7 1934 14 Sheets-Sheet 11

INVENTOR
Earl W. Curtis
BY Albert L. Ely
ATTORNEY

Feb. 8, 1938.                       E. W. CURTIS                        2,107,749
                     APPARATUS FOR THE MANUFACTURE OF PRETZELS
                            Filed Nov. 7 1934            14 Sheets—Sheet 12

INVENTOR
Earl W. Curtis
BY Albert L. Ely
ATTORNEY

Feb. 8, 1938.                    E. W. CURTIS                    2,107,749
                    APPARATUS FOR THE MANUFACTURE OF PRETZELS
                            Filed Nov. 7 1934            14 Sheets-Sheet 13

INVENTOR
Earl W. Curtis
BY Albert L. Ely
ATTORNEY

Feb. 8, 1938.                            E. W. CURTIS                          2,107,749
                          APPARATUS FOR THE MANUFACTURE OF PRETZELS
                                   Filed Nov. 7 1934                    14 Sheets-Sheet 14
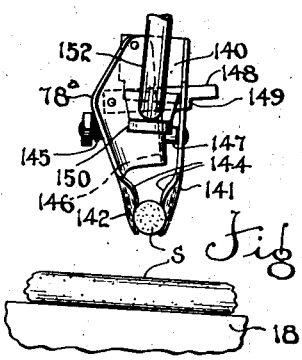
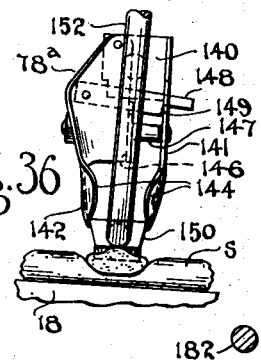
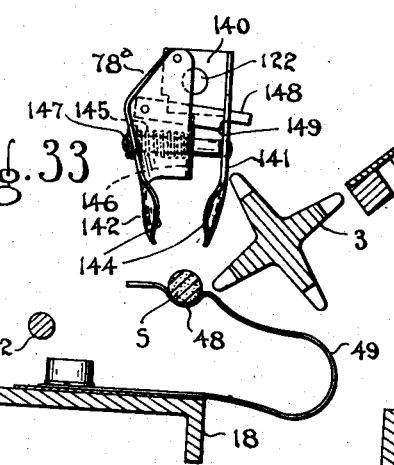
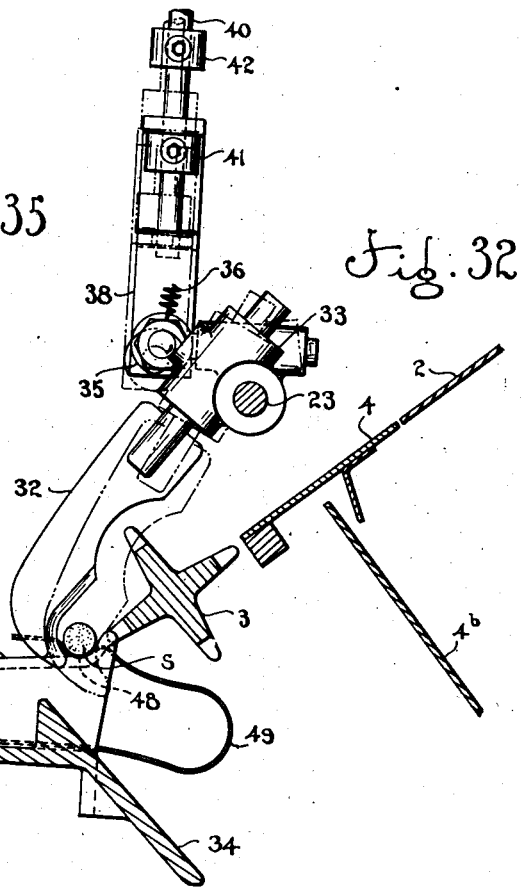
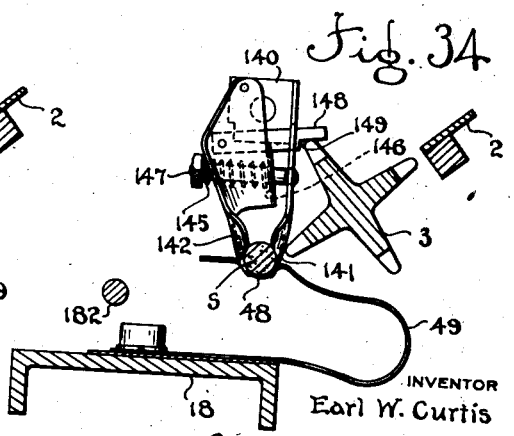
INVENTOR
Earl W. Curtis
BY
Albert L. Ely
ATTORNEY Patented Feb. 8, 1938

2,107,749

UNITED STATES PATENT OFFICE 2,107,749

APPARATUS FOR THE MANUFACTURE OF PRETZELS

Earl W. Curtis, Canton, Ohio

Application November 7, 1934, Serial No. 751,848

22 Claims. (Cl. 107—8)

The present invention relates to the making of pretzels by machinery and to the apparatus which has been developed and perfected for the mechanical manufacture of these articles.

Prior to the present invention it has been the universal practice to make, or twist, pretzels by hand, and while a number of prior patentees have attempted to devise machines to replace hand labor and to twist pretzels by machinery, so far as known to me all of these efforts have been failures.

The principle of operation of the present apparatus which twists the stick into pretzel form is different from previous machine methods and from the hand process in the movements performed to make the pretzel from the stick or "snake" as it is known in the trade. Heretofore a pretzel has been formed by twisting the stick into the central knot and then folding the loop over onto the ends of the stick or by folding the ends onto the loop.

The principle of operation of the machine disclosed and described herein is distinct in that the ends of the stick are manipulated in a peculiar manner to form the pretzel while maintaining the pretzel in substantially the same plane. Briefly stated the operation is as follows:

The straight stick of dough is seized at the two ends by grippers which are movable in paths and properly timed relation and the pretzel is thereby formed without a folding operation.

In this operation the ends of the stick are moved in arcs which pass each other at the center, both ends being elevated slightly to permit, say the right-hand end of the stick to move under the left-hand end. The left-hand end then stops and the right-hand end continues its movement to make a loop around the left-hand end and is tacked to the body of the stick, the left-hand end of the stick being located in the loop. The grippers which operated upon the right-hand end are then released and retrace their movement so as to get out of the way of the left-hand grippers. The left-hand end of the stick is drawn upwardly through the loop and tacked onto the main body of the stick. This forms the left-hand loop and the central twist, which action is accompanied by a slight deformation of the first loop so that the two loops are balanced.

It will be seen from the above résumé of the operation that a new series of steps has been devised for the making of a pretzel, and this constitutes a mode of operation which is capable of reproduction by machinery. The invention includes the automatic machinery for carrying it out. The drawings illustrate both the operation and the machine for carrying out the operation.

The present application is a continuation in part of the subject matter set forth in my copending application Serial No. 711,327, filed February 15, 1934, for Pretzel tying machines.

It will be understood that while the operation and machine are described herein in considerable detail, changes and modifications may be made in both without departure from the invention. The machine includes the proper mechanism to cause the stick-handling arms or grippers and the devices which tack the ends of the stick down onto the main body thereof to perform their functions in proper sequence and automatic means for feeding the sticks to the grippers cutting them to proper length and for removing the finished pretzels and laying them in parallel rows on a belt.

These and other objects will be apparent from the description in which the invention is set forth in such detail that it will be understood by those skilled in the art, but the invention is not limited to conformity with the details as set forth.

In order that the invention may be properly understood the drawings first show the pretzel in its various stages of formation, and then the machinery for performing those and the ancillary operations of stick feeding and cutting and pretzel discharge.

In the drawings,

Figures 1 to 10, inclusive, illustrate the various stages in the formation of the stick or "snake" into the finished pretzel. Of these figures, Figure 1 is a plan view in dotted lines of the stick and in full lines of the condition of the stick at the termination of the initial movement of the left-hand end, the right-hand end being started in its movement;

Figure 2 is a side view of the stick in this condition;

Figure 3 is a plan view of the stick after the two ends have crossed each other;

Figure 4 is a side view thereof;

Figure 5 is a view showing the stick at the end of the formation of the right-hand loop;

Figure 6 is a side view thereof;

Figure 7 is a view showing the formation of the left-hand loop;

Figure 8 is a side view thereof;

Figure 9 is a plan of the completed pretzel showing the manner in which the loops are balanced at the tacking of the left-hand end;

Figure 10 is a side view thereof.

The remaining figures show the machine. Of these figures:

Figure 11 is a front elevation of the complete machine;

Figure 12 is a plan view thereof;

Figure 13 is an elevation on the left-hand side of the machine;

Figure 14 is a horizontal section immediately above the gripper arms, the plane of the section being indicated by the line 14—14 of Figure 11;

Figure 15 is a similar view but showing the gripper arms in the position after the right-hand loop is formed, or that illustrated in Figure 5;

Figure 16 is a view showing the position of the gripper arms at the end of the pretzel forming operation corresponding to Figure 9;

Figure 17 is a vertical section on the line 17—17 of Figure 12 at the side of the right-hand stamper or tacker-foot showing the cam for swinging the two gripper arms;

Figure 18 is a vertical section on the line 18—18 of Figure 12 showing the cam which controls the oscillatory movement of right gripper arm;

Figure 19 is a vertical section on the line 19—19 of Figure 12 showing the cam which controls the oscillatory movement of the left gripper arm with the shafting in section;

Figure 20 is a vertical section on the line 20—20 of Figure 12 showing the cam and associated mechanism for raising the right-hand gripper arm carriage;

Figure 21 is a vertical section on the line 21—21 of Figure 12 showing the mechanism for raising and lowering the left-hand carriage;

Figure 12:
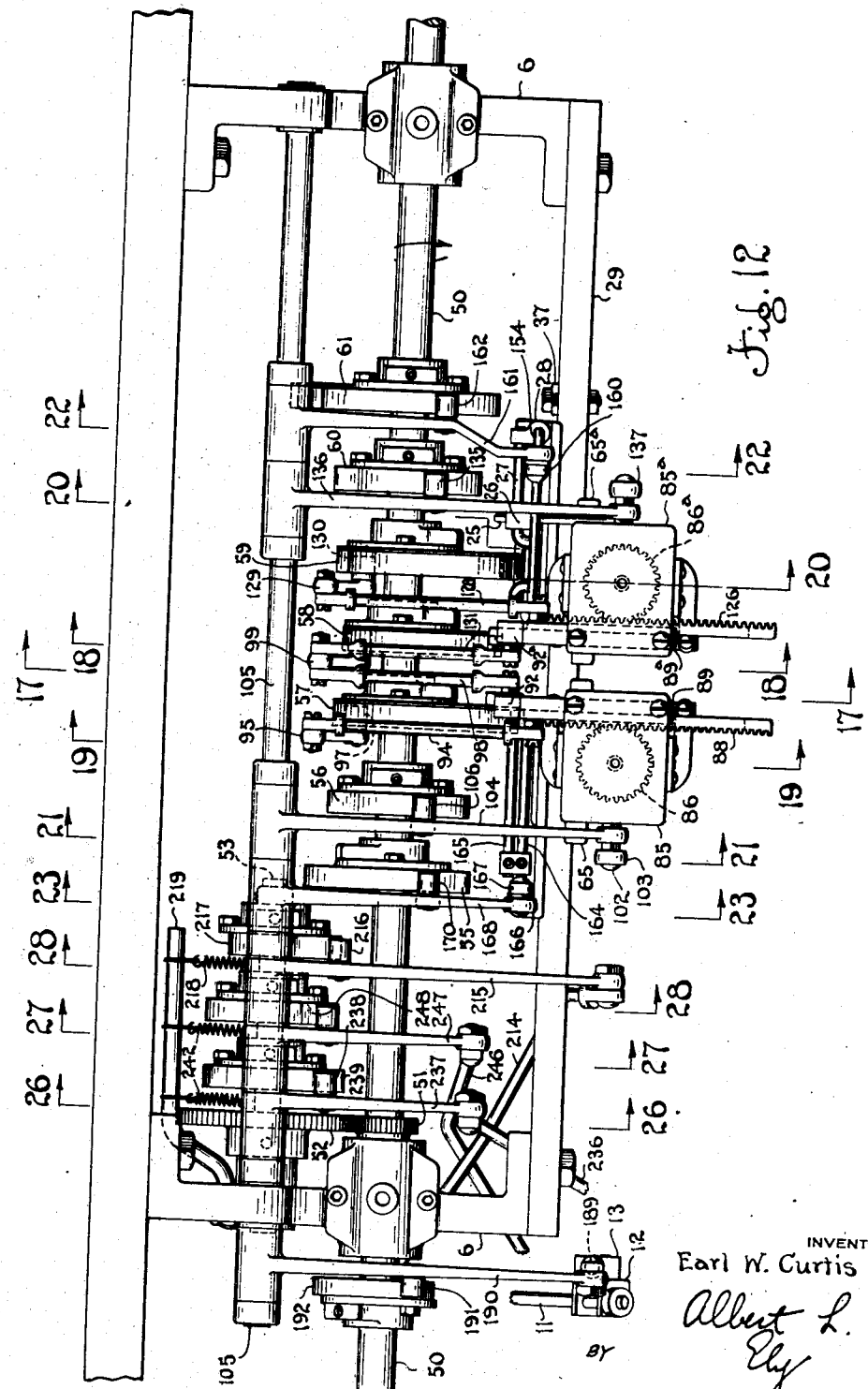
Figure 24:
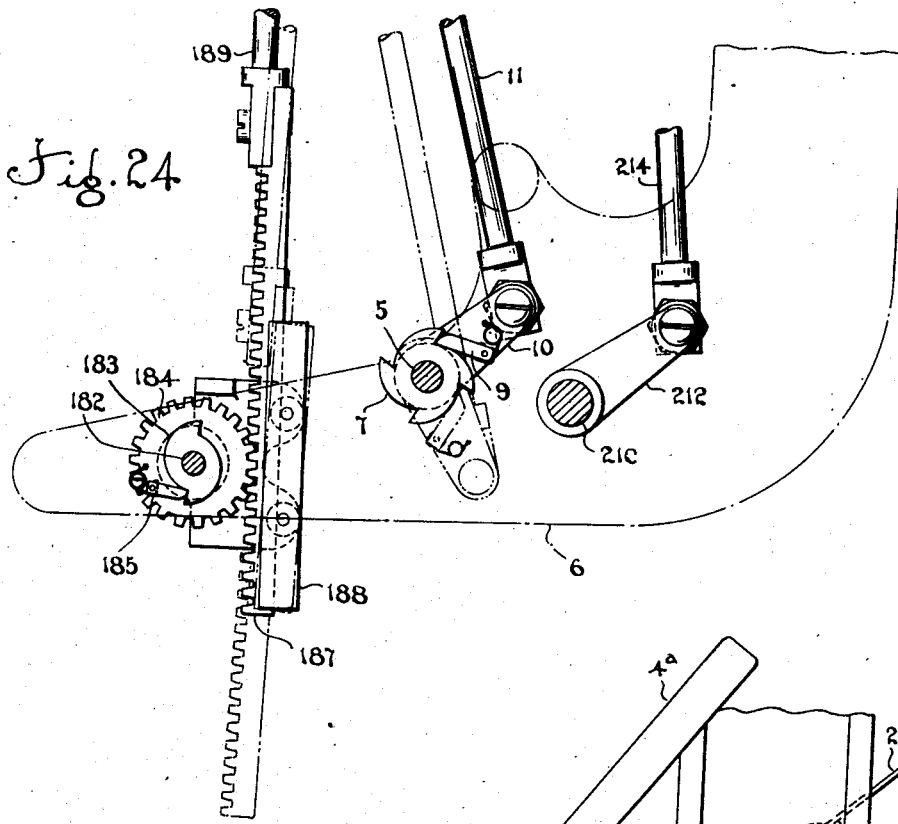
Figure 25:
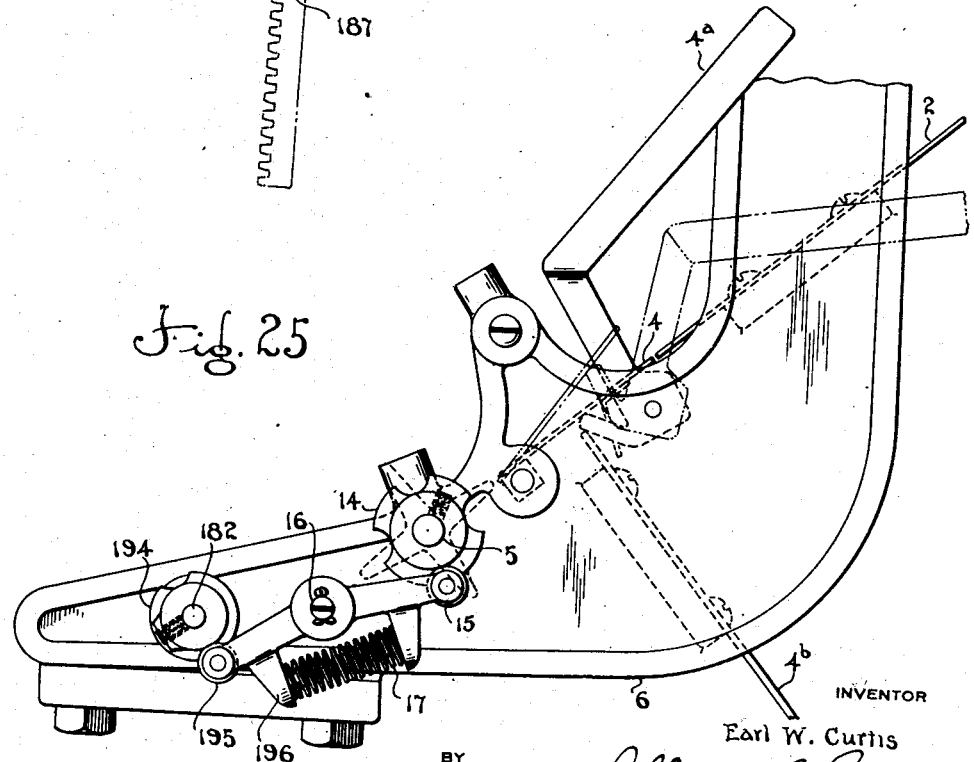
Figure 26:
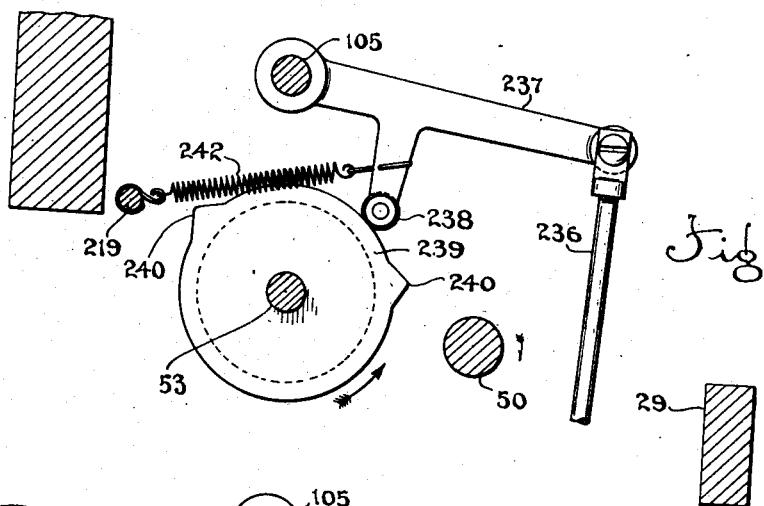
Figure 27:
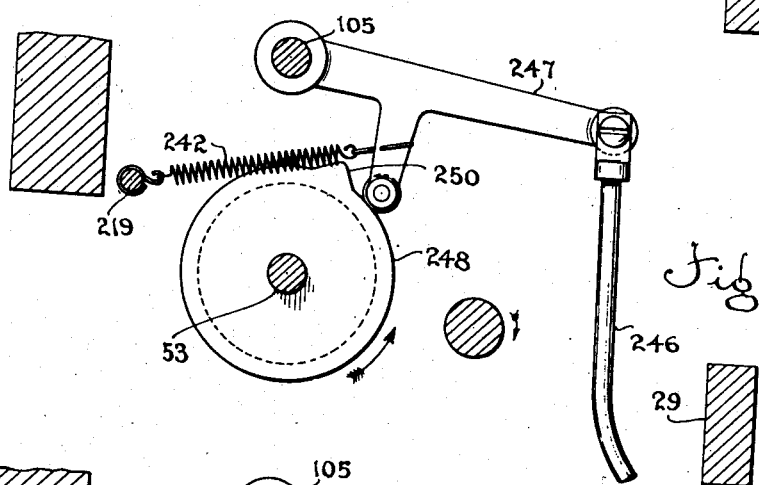
Figure 28:
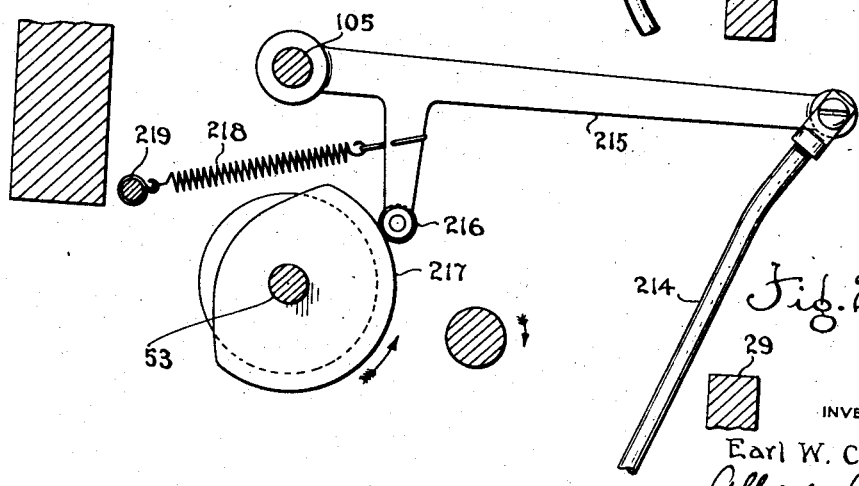
Figure 29:
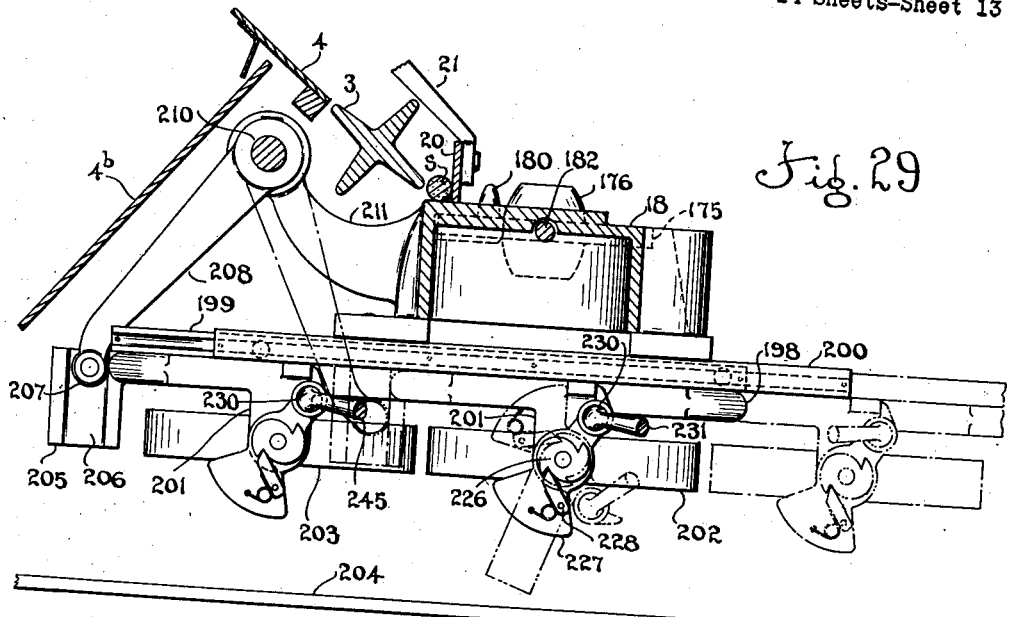
Figure 30:
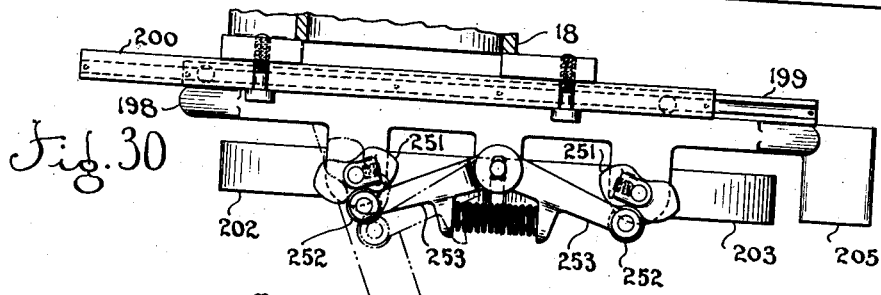
Figure 31:
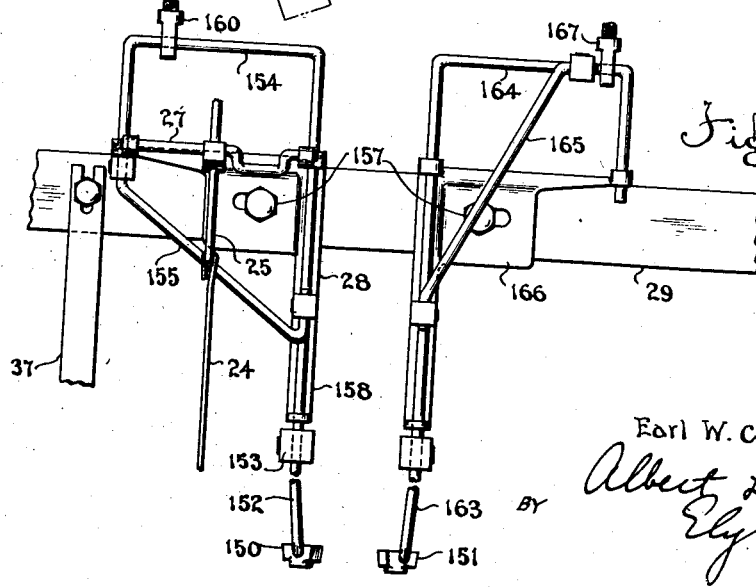

Figure 22 is a vertical section on the line 22—22 of Figure 12 showing the cam for raising and lowering the right-hand tacker-foot;

Figure 23 is a similar view on the line 23—23 of Figure 12 showing the left-hand tacker-foot operating mechanism;

Figure 24 is a view showing the mechanism for operating the stick feeding and pretzel discharging devices at the left of the machine;

Figure 25 is a view showing the lower right-hand side of the machine;

Figure 26 is a vertical section on the line 26—26 of Figure 12 showing the cam for operating the forward pretzel dumping tray;

Figure 27 is a section on the line 27—27 of Figure 12 showing the cam for operating the rear pretzel dumping tray;

Figure 28 is a section on the line 28—28 of Figure 12 showing the cam for actuating the tray carriage;

Figure 29 is a section on the line 29—29 of Figure 11 showing details of the pretzel dumping mechanism;

Figure 30 is a section on the line 30—30 of Figure 11 showing additional details of the pretzel dumping mechanism;

Figure 31 is a rear view of the tacker-feet mechanism;

Figure 32 is a section on line 32—32 of Figure 11 showing one of the knives;

Figure 33 is a section on the line 33—33 of Figure 11 showing the stick feeder and a gripper in raised position preparatory to picking up the stick;

Figure 34 is a similar view showing the gripper in the act of picking up the stick;

Figure 35 is a view showing a gripper in raised position with the stick end about to be tacked to the main body of the stick; and Figure 36 shows the gripper lowered showing the discharge of the stick with the tacker-foot in operation.

In the drawings, the stick or snake of dough as it is introduced into the machine ready for the pretzel forming operation is indicated at S (Figure 1), the right-hand end at R, and the left-hand end at L. The operation may be reversed as will be understood and the right and left ends are selected as such for the sake of describing the invention clearly. The ends R and L are moved so that they cross each other as shown in Figure 3, and while the end L is held the end R is formed into the loop and tacked at the point T'. In order to perform this operation satisfactorily the gripper holding the end L is moved outwardly as shown in Figure 5 so as to permit the arms to move without interference. This operation forms the first or right-hand loop with the left side of the stick within the loop. After the tacking operation the gripper for the end R moves out of the way, and the end L is then drawn up through the loop (Figure 7) and tacked down at the point $T^2$ completing the pretzel. It will be noted, as shown in Figure 9, that formation of the second loop tends to correct the malformation of the first loop so that a perfect pretzel will be formed. It will also be noted that during the operation the ends R and L are raised and lowered at various times to permit of the proper formation of the pretzel.

*Stick feeding and cutting devices*

The stick feeding and cutting mechanism will first be described.

The sticks as they come from the forming machine are slightly longer than required to make the pretzel and are cut to proper size so that the ends of the stick will always be correctly located with respect to the stick manipulating mechanism.

The sticks S are fed to the machine over a belt 1 and each stick rolls down an incline 2 until it lodges in the pocket of a star-wheel feeder bar 3 which is moved a quarter turn at proper intervals to place a stick under the grippers. The star-wheel feeder bar 3 is provided with short shafts 5 at either end, set into the bar, and these shafts are rotatably mounted in the lower sides of the right and left frames 6. At the lower end of the incline is a pivoted section 4 which may be raised to the dotted line position shown in Figure 25 by the handle 4ᵃ. In case the pretzel forming mechanism fails to operate properly, the section is raised to discharge the sticks over the chute 4ᵇ.

Figure 13:
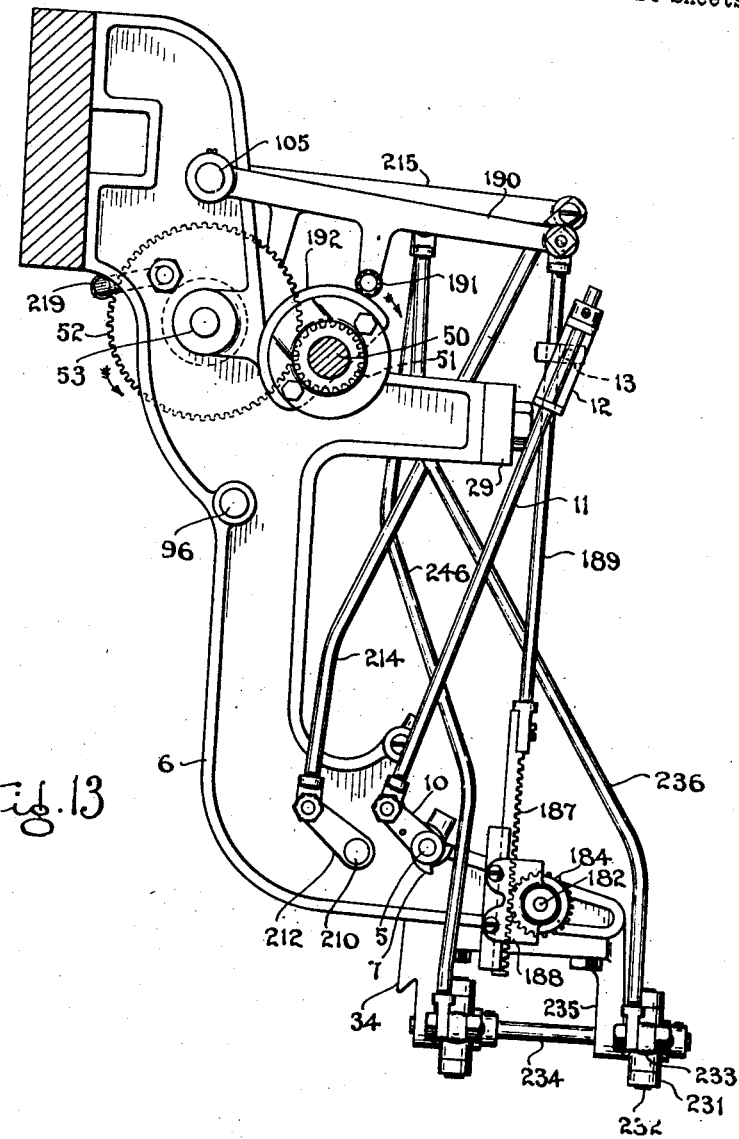

On the left-hand shaft 5 is located the four-step ratchet 7 (Figure 24) with which cooperates the pawl 9 carried upon the rocker arm 10. The arm 10 is oscillated so as to rotate the star-wheel to the required degree by a link 11 which extends upwardly to a bracket 12 (Figure 13) which is pivotally attached to a clamp 13 secured on the vertical rod which actuates the pretzel forming table so that as a finished pretzel is discharged a new stick will be moved into place in the machine. The mechanism for actuating the link 11 and star-wheel will be described in connection with the pretzel discharging device.

In order to prevent the star-wheel from overrunning, the right-hand shaft 5 is provided with a four-notched detent wheel 14 with which cooperates the pivoted detent 15 which is mounted on the stud 16 and actuated by the spring 17 (Figure 25).

To prevent the snake or stick from rolling out of place on the bed plate 18 and to position the stick properly so that it will be picked up by the grippers, two stop bars 20 are located on either side of the center line of the machine at the sides of the finished pretzel. During the pretzel twisting operation these bars are raised above the bed plate as shown in dotted lines in Figure 17 so that the pretzel stick may be manipulated. After the grippers have moved the ends of the stick outwardly and while the new stick is being positioned the bars are lowered as shown in full lines so that the stick is located between the bars and the star-wheel. The stop bars 20 are carried by arms 21 which are connected to a sleeve 22 rotatably mounted on the knife shaft 23. The weight of the bars will cause them to assume the full line position of Figure 17, and they are raised into dotted line position by a link 24 which is connected at its upper end to a lever 25. The lever 25 is fixed in a block 26 carried on a rock shaft 27 which is mounted in a bracket 28 secured to the rear face of the upper crossbar 29, the latter being attached to extensions on the side frames 6. The end of the lever 25 is extended forwardly and is held by the weight of the crossbars in contact with the under side of the right-hand gripper arm carriage, the position of which thereby controls the position of the stop bars. The stop bars are required to be in their lowered position only during the period when this carriage is raised at the end of the pretzel forming operation.

After the ends of the stick are seized by the grippers and before the grippers move in the twisting operation the stick is cut to proper length against the stationary blades 31 by the movable knives 32 located on either side of the grippers as they are in the gripping position. These knives are carried by brackets 33 which are secured to the knife shaft 23 and are in the form shown in Figure 32. It will be noted that the knives and the star-wheel are both notched so that they do not interfere. It is necessary that the knives be raised, as shown in full lines in Figure 32 as the sticks roll into place and then moved to the dotted line position to cut, in which latter position they remain during the balance of the operation. The scrap from the stick rolls down the chute 34.

To actuate the knives the shaft 23 carries a bracket 35 to which is attached the contractile spring 36, the opposite end of which is fastened in an adjustable bar 37 suspended from the crossbar 29. The bracket 35 is pivotally connected to the angular plate 38 through the upper arm of which slides the lower end of an actuating rod 40. On the lower end of the rod 40 and on either side of the upper arm are the two adjustable stop collars 41 and 42. There is a limited lost-motion between the rod and the angular plate so that the knives are given a quick cutting action. The rod 40 is moved by attachment to the right-hand gripper carriage, being connected at its upper end to a pin 44 on the carriage. The knives are thus raised at the extreme upward movement of the carriage at which time the stick is being rolled into position. As the carriage lowers, the knives are snapped down by the spring, cutting off the stick to the proper length.

It will be noted that the ends of the stick are supported in depressions 48 formed in light curved spring holders 49 fastened to the bed plate 18 at the points of attachment of the stationary knife blade 31. This depression accurately positions the end of the stick beneath the gripper and the holder will readily yield and permit the stick to be moved outwardly by the gripper at the commencement of the twisting operation. The ends of the holders are bent downwardly slightly to permit the gripper to depress the holders as they move into position.

THE PRETZEL FORMING MECHANISM (a) *In general*

The series of operations by which the stick is formed into the finished pretzel has already been described. The two gripper arms and their actuating mechanisms are, in general, alike, but in certain operations they are distinct, each having movements peculiar to itself and operating in different timed relation to the other. The tacker-feet also operate at different times. Wherever it is possible to do so, the common features of the device will be described at the same time.

Across the top of the machine and mounted in the upper side brackets is the main cam shaft 50 which is driven in the direction shown by the arrows on the various figures. This shaft is mounted in suitable bearings in the end frame and is provided at one end with a suitable clutch device (not shown) through which the shaft is driven and by means of which a unit may be positioned in driving relation to permanent shafting so that a unit may be moved or replaced quickly. At the left-hand end of the machine it carries a spur gear 51 which meshes with a gear 52 on the secondary cam shaft 53. The cam shaft 53 controls and operates the pretzel discharging and dumping instrumentalities as will be described later. The shaft 50 controls both the swinging and the oscillating movements of the arms which grip the stick, the raising and lowering of the arm carriages and the operation of the tacker feet and the star-wheel. Through the right arm carriage the movements of the stop bars and knives are controlled as has been explained.

Referring particularly to Figure 12, the several cams and the mechanism which they control and operate will be described in order from left to right.

The cam 55 operates the left tacker foot. The cam 56 raises and lowers the left-hand carriage. The cam 57 operates the rack by which the left-hand gripper arm is oscillated about its own axis. The cam 58 is a single cam controlling through racks the swinging movement of the two gripper arms. The cam 59 operates the rack by which the right-hand gripper arm is oscillated about its own axis. The cam 60 raises and lowers the right-hand carriage, and the cam 61 operates the right-hand tacker foot.

(b) *The left-hand gripper arm*

Figure 19:
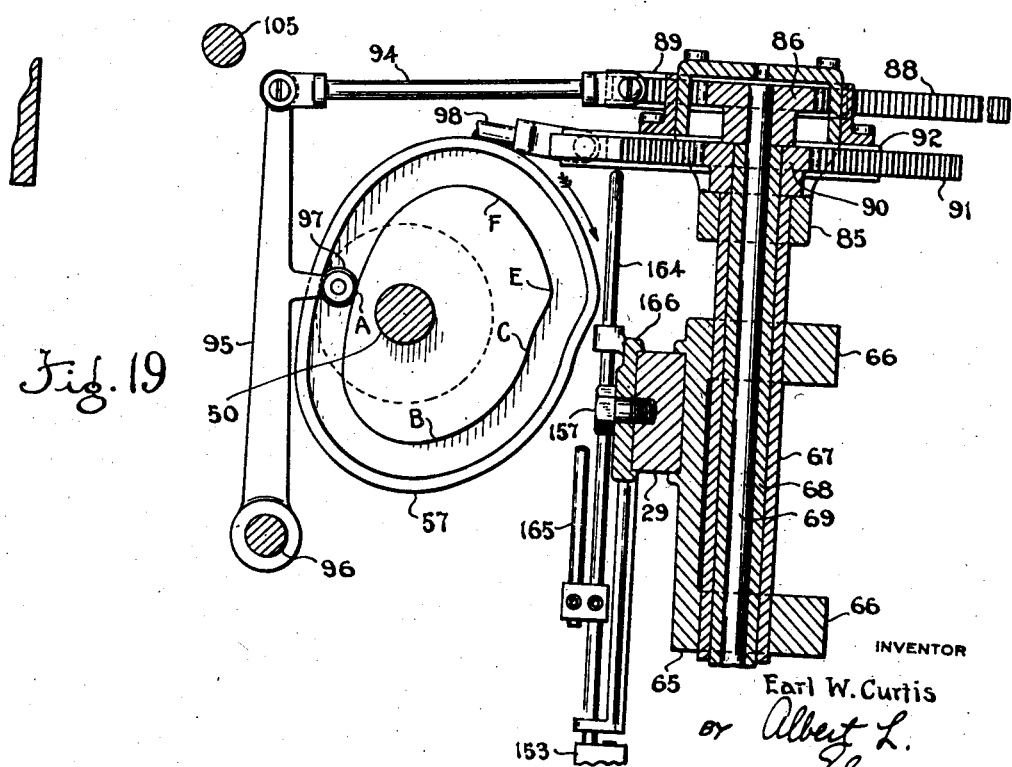

Attached to the crossbar 29 is the stationary bracket 65 formed with two lugs 66 in which slides the sleeve 67. In the sleeve is a second rotary sleeve 68 within which is the shaft 69 (Figure 19). At its lower end the sleeve 68 carries the swinging arm 70 on the outer end of which is secured the depending shaft 71. On the shaft 71 is supported a rotary bracket 72 provided with a guideway 73 in which the short rack 74 is movable. This rack meshes with a pinion 75 on the shaft 71, to which pinion is secured a hub 76. In the hub is mounted the arm 77 to the lower end of which is secured the left-hand gripper, indicated generally by the numeral 78. It will be observed that the arm 77 is formed with a bend 79 which is provided to prevent interference with the somewhat similar arm on the right-hand gripper.

The rack 74 is pivoted at its inner end to an arm 82 which is mounted in a hub piece 83 secured to the lower end of the shaft 69 where it projects below the sleeve 68.

The movement of the left-hand gripper arm is a compound movement as it partakes of the swinging movement of the arm 70 and also has a planetary movement on its own axis, the former movement being imparted by the rotation of the sleeve 68 and the latter by the rotation of the shaft 69, through the rack 74 and gear 75. By this compound mechanism it is possible to make the gripper 78 move in its peculiar path and in properly timed relation to the movement of the right-hand gripper.

The outer sleeve 67 is attached at its upper end to a C-shaped casting 85 between the arms of which are located the gears and racks which rotate the inner sleeve and the shaft 69 (Figure 19). The shaft 69 carries at its upper end a pinion 86 which is engaged by the sliding rack 88 movable in the guideway 89 on the casting 85. Below the pinion 86 the inner sleeve 68 carries the pinion 90 with which is engaged the rack 91 movable in the guideway 92 on the casting.

The rack 88 is connected by the link 94 to a rocker arm 95 pivoted on the main cam lever shaft 96. A roller 97 carried by the arm 95 engages the cam 57. The rack 91 is connected by the link 98 to the rocker arm 99 also pivoted on the shaft 96 (Figure 17). A roller 100 on the arm 99 engages the cam 58. As shown in Figure 12 the arm 99 controls the swinging movement of both of the gripper arms through the operation of the single cam 58.

To the side of the C-casting 85 is secured the pin 102 on which is pivoted the link 103 which is in turn pivoted to the rocker arm 104 mounted upon the upper cam lever shaft 105. The arm 104 carries the roller 106 which rides upon the cam 56 (Figure 21). To prevent the casting 85 from rotating a depending guide pin 107 is provided which is received in the bracket 65, a light spring 108 surrounding the pin and cushioning the vertical movement of the left-hand carriage.

It will be seen that by the joint action of the swinging arm 70 and the rotary or oscillating movement of the arm 77, the path of the gripper 78 may be controlled so that the desired movement will be secured. The two operating cams, 57 controlling the rotary movement and 58 controlling the swinging movement, are formed so as to secure these results at the same time the elevation of the carriage is controlled by the cam 56 raising and lowering the gripper arm at the proper times. The path of the left-hand gripper 78 may be briefly described.

At the position of rest the left-hand gripper arm is above the pretzel stick. In this position the various cams controlling the movement of this arm are in the position shown in Figures 17, 19, and 21 respectively, it being noted that the roller 106 is on the high portion of the cam 56 so that the carriage is raised. As the shaft 50 revolves, the carriage is lowered so that the gripper seizes the stick as will later be described. The rotation of the cam 58 swings the arm 70 outwardly to the position shown in Figure 15 where it dwells over the high part of the cam during the balance of the pretzel tying operation and then is moved backwardly to its starting position.

While the movement above described has been going on, the cam 57 oscillates the arm 77 outwardly as the roller moves from the point A to the point B which brings the end L of the stick to the position shown in Figure 2, at which point the left-hand end of the stick is stationary until the point C is reached. As the arm 77 approaches the point B the carriage is elevated by the projection D on cam 56, lifting the end of the stick as shown in Figure 4 so that the end R may pass beneath it. From the point C to the point E on cam 57, the rotation of the arm 77 is increased rapidly bringing the end L over the tacking point T². From point E to point F the rotation of the arm 77 is stopped, and from point F to point A the arm is returned to its original position. Shortly after the tacking operation the cam 58 will swing the arm 70 back to its starting position. During this operation the carriage has been raised and lowered. After passing over the point D on cam 56, the roller 106 lowers the carriage sharply to permit the completion of the right-hand loop, then the left-hand carriage is raised by the projection G to draw the end L over the end R. At the point H the carriage is lowered to permit the tacking and then raised at I to free the pretzel and kept at this elevation until the starting point is reached.

(c) *The right-hand gripper arm*

The right-hand bracket and internal shafts are the same as the left-hand bracket and are given the same numerals with the letter "a" added thereto. The shaft 69ᵃ carries the upper pinion 86ᵃ, and the sleeve 68ᵃ carries the lower pinion 90ᵃ (Figure 20). The C-shaped casting 85ᵃ is the same as the casting 85 except oppositely turned.

At its lower end the sleeve 68ᵃ carries the swinging arm 115 on the outer end of which is secured the depending shaft 116. On the shaft 116 is supported a rotary bracket 117 provided with a guideway 118 in which the short rack 119 is movable. This rack meshes with a pinion 120, to which is secured a hub 121. In the hub is mounted the arm 122 to the lower end of which is secured the left-hand gripper, indicated generally by the numeral 78ᵃ. It will be observed that the arm 122 is formed with a bend 123, but the arm is somewhat longer and the bend not so abrupt as that in the arm 77. This enables the two arms to mate and cross each other during the twisting operation as will be seen by an inspection of Figure 15.

The rack 119 is pivoted at its inner end to an arm 124 which is mounted on a hub piece 125 secured to the lower end of the shaft 69ᵃ where it projects from the sleeve 68ᵃ.

A planetary movement is also imparted to the right-hand gripper by mechanism the same in principle but with a different action and timing. The pinion 86ᵃ is actuated by the rack 126 and the pinion 90ᵃ by the rack 127. The former is connected by a link 128 to the rocker arm 129 which carries the roller 130 movable over the cam 59. The rack 127 is connected by a link 131 to the arm 99. As before remarked the rocking movement of both arm 70 and 115 is the same, the difference in action being secured by the oscillation of the gripper arms.

The right gripper arm carriage is raised and lowered by the cam 60, over which travels the roller 135 on the rocker arm 136 on the shaft 105.

The forward end of the arm 136 is connected by the link 137 to the pin 44 previously described on the casting 85ª.

Figure 18:
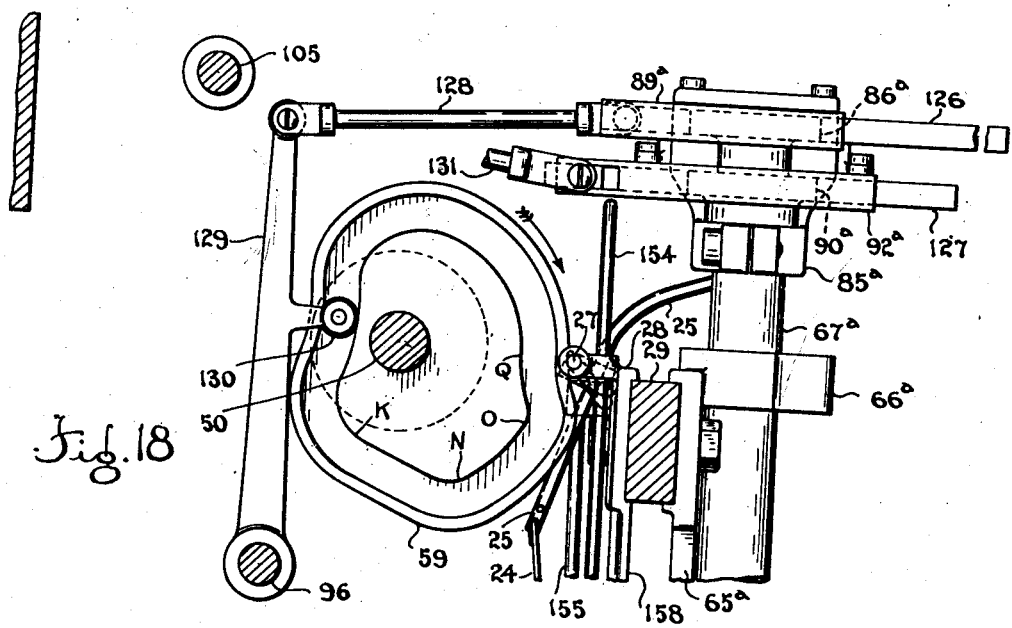

Tracing the movement of the right gripper arm and referring particularly to Figures 18 and 20, it will be seen that the carriage is first lowered as the roller 135 passes off the high part of the cam to enable the gripper 78ª to grip the end R of the pretzel stick. As the arm 115 swings outwardly the gripper arm is oscillated outwardly until the roller 130 reaches the point K on the cam 59 so that it projects forwardly to bring the end R to the position shown in Figure 1. This enables the gripper 78 to pass behind the gripper 78ª. As the gripper arm leaves this point the carriage is elevated by the projection M on the cam 60, the position of the ends being shown in Figure 4. From the point K to the point N the gripper arm is oscillated sharply inwardly bringing the end R over the tacking point T'. From point N to point O the gripper arm is stationary while the carriage is lowered by the depression P on the cam 60 when the tacking operation is performed. The carriage is then raised and remains at its raised elevation during the remainder of the movement. From the point O to the point Q the cam recedes sharply to permit the gripper 78 to act and then from the point Q to the starting point the idle right gripper retraces its course to the starting point.

It will be observed that the operation of the knives and the stop bars 20 are controlled by the raising and lowering of the right-hand carriage, the knives being raised and the bars lowered as the carriage rises at the point M. The knife remains elevated while the carriage is elevated and lowered when the carriage is lowered to pick up the stick. During the return movement of the grippers the carriage is elevated, and during this period the stop bars are lowered and the star-wheel is actuated. The stop bars are raised and lowered also during the period from the points M to P, but this is an idle movement only. The lost motions provided by the adjustable collars 41 and 42 prevent the actuation of the knives during the shorter drop at the point P, it being observed that the cam 60 is slightly lower at the starting point than at this point.

(d) *The gripper arms*

The construction of the two grippers is identical. Each consists of a block 140 secured to the end of its arm from which depends the stationary finger 141, a companion finger 142 being pivoted to the block (Figures 33 to 36). The lower edge of each finger is notched as at 143 (Figure 11) to embrace the pretzel stick. The fingers are also provided with wings 144 which hold the stick as shown in Figure 35. The pivoted finger is yieldingly moved toward the stationary finger by a light spring 145 which bears against a flange 146 on the pivoted finger and is held upon a post 147 on the stationary finger. On the movable finger is located a light, gravity actuated, trigger 148 provided with a shoulder 149. This trigger passes through a slot in the stationary finger, and when the fingers are open the trigger drops into place holding the fingers open. When the arms are over the ends of the stick the tail of each trigger is over the star-wheel so that as the grippers descend the trigger strikes the star-wheel and is released causing the arms to contract and seize the stick as shown in Figure 34. The fingers are opened up by the tacker feet 150 and 151 which are provided with sloping faces to cause the arms to spread and to set the trigger for the next operation. It will be noted that when the arms are over their respective tacking points, the respective tacker-feet are above and in line with the gripper so that they may enter the space between the fingers and eject the ends of the sticks and tack them to the main body. The position of grippers and the tacker feet just before the tacking operation is shown in Figure 35, and at the end of the tacking stroke in Figure 36. Both the grippers and the tackers descend at this time, but the tacker descends faster so that it overtakes the gripper. The tacker dwells at the tacking point while the gripper rises so that the latter clears the tacker before it starts its return movement.

(e) *The stampers*

The right-hand stamper or tacker is indicated at 150 and the left-hand tacker at 151. Each tacker is a wedge-shaped block with a flat under surface of sufficient extent to perform the tacking operation. The tacker 150 is supported on the lower end of an oblique vertical rod 152, the upper end of which is fixed in a block 153. Block 153 is secured to the lower end of the long vertical arm of an actuating member 154. This member is formed with the two parallel vertical arms and a top cross arm as shown in Figure 31. Across the lower end of the member 154 is the diagonal brace 155. The vertical arms of the member 154 are received and guided in the bracket 28 which is adjustably secured at 157 to the rear face of the crossbar 29, and which is provided with the extension 158 to guide the lower end of the member 154. The member 154 is raised and lowered to actuate the tacker foot 150 by an adjustable link 160 which is pivoted on the end of the arm 161 which rocks on the shaft 105. The arm 161 and the parts carried thereby are supported by the roller 162 on the cam 61. When the cam moves through approximately 135° from the position shown in Figure 22, the arm 161 is lowered, moving the right tacker bar downwardly, and this operation occurs while the right gripper is over the tacking point.

The left tacker foot 151 is carried by the rod 163 which is connected to the vertical actuating member 164 similar to the member 154 and braced by the diagonal crossbar 165. The member 164 is reciprocable in the adjustable L-shaped bracket 166 also attached to the crossbar 29. An adjustable link 167 connects the member 164 with its operating rocker arm 168 supported on the roller 170 riding on the cam 55. It will be noted that the cam 55 acts after the cam 60 due to the fact that the left tacker operation follows the right tacker operation and is at the completion of the pretzel forming operation.

*Pretzel discharging and dumping mechanism*

Figure 14:
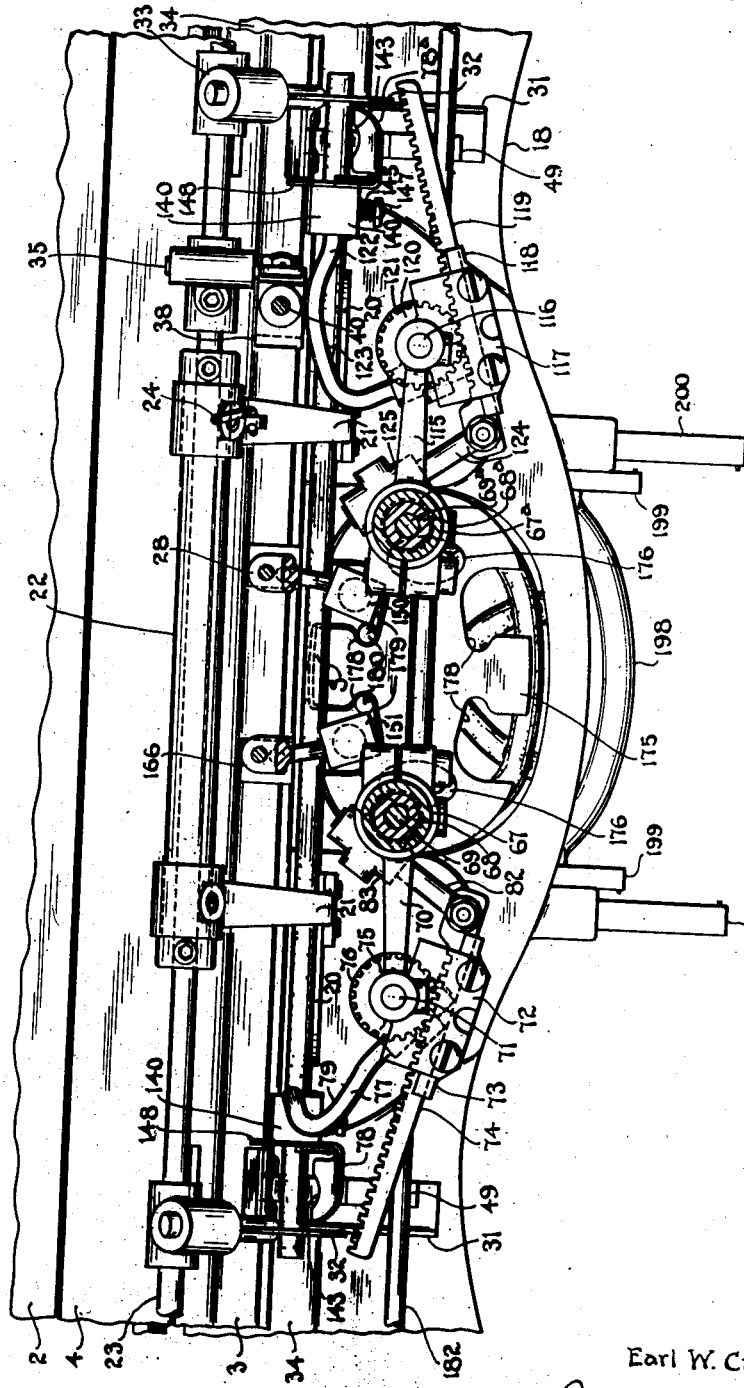

The bed plate 18 which extends across the lower ends of the side arms 6 is provided with a central opening at the location of the pretzel and in this opening is the oval-shaped turntable 175 on which the pretzel is formed. The turntable is provided on its two faces with oval-shaped lugs 176 which constitute two fixed points around which the right and left loops are formed. The table is cut away as shown at 178 to admit the fixed extensions 179 for the turntable, on which are located the fixed pins 180 (Figure 14), which are placed just within the tacking points and forwardly of the stick. The location of the points 176 and 180 are indicated on Figure 9, and it will be seen that these assist in the formation of the pretzel by fixing it at four points, but do not interfere with the twisting or forming operations.

After each forming operation the turntable is rotated 180° discharging a pretzel at each turn. For this purpose the table is mounted upon the horizontal shaft 182 which extends across the frame and is provided at its left-hand end with a two stop ratchet 183 (Figure 24). A pinion 184 is rotatably mounted on the end of the shaft and carries a spring-actuated pawl 185 cooperating with the ratchet. The pinion 184 is rotated through 180° by a rack 187 which is slidably mounted in a guideway on a pivoted bracket 188 on the shaft 182. Rack 187 is secured to the lower end of the rod 189, the upper end of which is pivoted to the rocker arm 190 mounted on the end of the shaft 105 at the left-hand side of the machine. The arm 190 is supported by roller 191 riding on the edge of the cam 192 secured to the main cam shaft 50. At the completion of each revolution of the cam shaft the turntable is revolved to discharge a completed pretzel. In order to hold the table in proper position the right end of the shaft 182 is provided with a two notched disk 194 with which cooperates a roller 195 on the pivoted arm 196 actuated by the spring 17 (Figure 25).

It will be noted that the stick feeding mechanism previously described is actuated by the same cam through the link 11.

Beneath the table is located the pretzel dumping carriage which comprises a generally oval-shaped frame 198 which is suspended from two parallel guide bars 199 supported upon balls moving in grooves in opposite faces of fixed channel bars 200 attached to the under side of the bed plate. From the under side of the frame depend lugs 201 in which are pivotally mounted the two pretzel dumping trays, a forward tray 202 and a rear tray 203. One of these trays is beneath the turntable whenever a pretzel is discharged and in turn dumps the pretzels upon a belt 204 in three rows. In order to accomplish this purpose the forward tray 202 receives a pretzel beneath the turntable and dumps it at that point. It then receives a second pretzel and moves forward to dump it beside the first. While the second pretzel is being dumped the tray 203 is below the turntable and receives a pretzel which it carries rearwardly and dumps at the opposite side of the first deposited pretzel. The conveyor belt may then be advanced a step by mechanism, not shown, to receive a second row of pretzels. By this dumping device the capacity of the baking oven through which the belt travels is increased.

The mechanism to reciprocate the carriage and to turn the trays will now be described.

The carriage is reciprocated to bring it into register with the turntable by the following mechanism. The rear of the carriage is provided with a tail piece 205 in which is located the vertical channel 206 in which moves the roller 207 on the end of a rocker arm 208 which moves from the full line to the dotted line position shown in Figure 29. The arm 208 is secured to the shaft 210 mounted at one end in a bracket 211 extending rearwardly from the bed plate and at its opposite end in the left side frame. At the side of the machine the shaft 210 has fixed thereto a crank 212 which is connected by an angular link 214 to the end of a rocker arm 215 mounted on the shaft 105. A roller 216 is carried by the arm 215 and is held against the surface of the cam 217 by the spring 218, the opposite end of which is fastened on a pin 219 fixed to the end frame.

The cam 217 is carried by the secondary cam shaft 53 and is so formed that during a portion of the operation the carriage is retracted but is moved forward when a pretzel is dumped at its outer position by the tray 202 and when a pretzel is discharged into the rear tray.

The mechanism for turning the trays 180° to dump the pretzels will now be described.

The forward tray 202 is fixed to the shaft 225 supported in the forward lugs 201. The left-hand end of this shaft carries a two-step ratchet 226, and pivotally mounted on the shaft is the rocker plate 227 which carries the spring-held pawl 228 cooperating with the ratchet. In the rocker plate is a socket 230 in which is received the ball-shaped end of a rocker arm 231, the end of which is forked and pivoted on the shaft 232 on the arm 233 which is pivoted in turn on the shaft 234 supported in lugs 235 depending from the bed plate. The arm 233 is connected by link 236 to a rocker arm 237 on the shaft 105. A roller 238 rides on the surface of a cam 239, which is provided with the two projections 240 and is held by a spring 242 connected to the pin 219. The projections 240 are so arranged that they will actuate the forward tray turning mechanism twice during the operation so that this tray will be turned over in its two positions. The mounting of the rocker arm 231 is a form of universal mounting whereby the mechanism will operate in either position and will not interfere with the reciprocation of the tray carriage.

The rear tray 203 is provided with a similar lever mechanism which will not be described in detail except to note that the rocker arm is designated by the numeral 245, the connecting link 246, the rocker arm by the numeral 247 and the cam by the numeral 248 (Figure 27). As the rear tray dumps only once and when the carriage is at the rear end of its movement, the cam 248 is provided with one projection only, 250.

In order to insure the horizontal position of the trays, except when dumping, each shaft of a tray is provided with the two notched plate 251 with which is engaged a roller 252 on the end of a swinging spring-pressed arm 253 supported on the carriage (Figure 30).

Résumé

The operation of the machine will have been clear from the preceding description.

As the sticks roll into position successively beneath the gripper arms and are cut, the ends are seized and moved as described, the right-hand end completing its loop first and the left-hand end being drawn through the first loop. At the end of each loop forming operation the ends of the sticks are tacked and the arms move back to their starting position. The finished pretzel is then discharged.

The machine acts automatically throughout and will exceed in output the average hand operator, making the pretzels perfectly and in exact simulation of a hand twisted pretzel. The mechanism is a labor-saving machine which will permit the production of pretzels more economically than by the present system.

Being the first machine of the type operating upon the new principles described, the claims are not limited to the mechanism shown, but will cover equivalent or modified machines within the scope of the appended claims. For example, it may be possible to omit the central twist and make an imitation pretzel utilizing the principles of the swinging arms and tacker devices. This product would take the form generally of the letter B or a modified form thereof with the two loops crossing one another.

What is claimed is:

1. A pretzel forming machine comprising means for locating a straight dough stick, two grippers for the ends of the stick, means for actuating the grippers to seize the ends of the stick, means for moving the grippers into crossed relation, said means comprising means for moving one gripper over the center portion of the stick while the other is stationary, means for then moving the other gripper over the center portion of the stick, and stampers to attach the ends of the stick to the body thereof.

2. A pretzel forming machine comprising means for positioning a dough stick, two grippers adjacent the stick positioning means and movable into gripping relation with the stick, pivoted supporting arms for the grippers, and means for moving the arms into crossing relation and continuing the movement of one arm to form one side of the pretzel and to move the second arm to form the other side of the pretzel.

3. A pretzel forming machine comprising means for positioning a dough stick, two grippers adjacent the stick positioning means and movable into gripping relation with the stick, pivoted supporting arms for the grippers, means for moving the arms into crossing relation and continuing the movement of one arm to form one side of the pretzel and to move the second arm to form the other side of the pretzel, and means to press the ends of the stick onto the body.

4. A pretzel forming machine comprising means for positioning a dough stick, two grippers located adjacent the stick positioning means and adjacent the ends of the stick and movable toward the stick, gripping jaws movable together to grip the stick as the arms approach the stick, and means to move the arms in intersecting arcs to form the side loops successively.

5. A pretzel forming machine comprising means for positioning a dough stick, two grippers located over the stick positioning means and over the ends of the stick and movable downwardly toward the stick, gripping jaws movable together to grip the stick as the arms are lowered, and means to move the arms in intersecting arcs to form the side loops successively and to vary the elevations of said arms to cause the ends of the stick to cross each other to form the knot.

6. A pretzel forming machine comprising means for positioning a dough stick, two grippers located over the stick positioning means and over the ends of the stick and movable downwardly toward the stick, gripping jaws movable together to grip the stick as the arms are lowered, and means to move the arms in intersecting arcs to form the side loops successively and means to vary the relative elevations of said arms to cause the ends of the stick to cross each other to form the knot and to lower each arm at the termination of its movement to bring the ends of the stick toward the body thereof.

7. A pretzel forming machine comprising means for positioning a dough stick, two grippers located over the stick positioning means and over the ends of the stick and movable downwardly toward the stick, gripping jaws movable together to grip the stick as the arms are lowered, means to move the arms in intersecting arcs to form the side loops successively and means to vary the relative elevations of said arms to cause the ends of the stick to cross each other to form the knot and to lower each arm at the termination of its movement to bring the ends of the stick toward the body thereof, and stampers to attach the ends of the stick to the body.

8. A pretzel forming machine comprising means for introducing a stick of dough into the machine, cutters for severing the ends of the stick, grippers to seize the ends of the stick, and means to move the grippers over intersecting arcs to form side loops of the pretzel successively.

9. A pretzel forming machine comprising means for feeding sticks of dough into position in the machine, grippers for the ends of the stick, and means acting in timed relation to move the grippers to form the sticks into pretzels by bending the ends of the stick into side loops successively and the center knot while the body of the pretzel is maintained in the same plane.

10. A pretzel forming machine comprising means for feeding sticks of dough into position in the machine, knives for cutting the ends of the sticks, grippers for the ends of the stick, and means acting in timed relation to move the grippers to form the sticks into pretzels by bending the ends of the stick into the side loops successively and the center knot while the body of the pretzel is maintained in the same plane.

11. In a pretzel forming machine, a stick bending mechanism for each end of the stick, each mechanism comprising an independently operated rocking arm and a secondary arm pivoted on the end of the rocking arm, a gripper on the end of the secondary arm, and means for moving the rocking arm and for moving the secondary arm thereon to bend the end of the stick to form one side loop of the pretzel.

12. In a pretzel forming machine, a stick bending mechanism for each end of the stick, each mechanism comprising an independently operated rocking arm and a secondary arm pivoted on the end of the rocking arm, a gripper on the end of the secondary arm, means for moving the rocking arm and for moving the secondary arm thereon to bend the end of the stick to form one side loop of the pretzel, and a stamper for attaching the end of the stick to the body thereof at the end of the loop-forming operation.

13. In a pretzel forming machine, a stick bending mechanism comprising two parallel end bending mechanisms each comprising a gripper supporting arm, means to move the arms in intersecting arcs with the arms in crossed relation, means for causing a dwell in one arm while the other continues its arcuate movement to form one loop, a stamper to attach that end of the stick to the body thereof, the second arm then continuing its arcuate movement, means to elevate the second arm to carry its end of the stick over the first loop to make the second loop and the center knot, and a second stamper to attach the second end of the stick to the body thereof.

14. In a pretzel making machine, dough stick positioning means, two grippers which in a position of rest are located over the stick positioning means and over the ends of the stick, means to lower the grippers and cause them to seize the ends of the stick, means to move the grippers in intersecting arcs to form a large loop, means to cause one gripper to continue its movement around and over the other end of the stick to form a side loop and to cause the other gripper to continue its movement to draw the second end of the stick through and over the said loop to form the other side of the pretzel, and means operating upon the stick ends successively to attach them to the body of the stick.

15. In a pretzel making machine, two grippers having a planetary movement in intersecting arcs, one of said grippers having a continuous movement around the other to form one side loop of the pretzel, and means for causing the other gripper to pause while the loop is being completed and then resuming its arcuate movement to bring its end through the loop and to form the center knot and its side loop of the pretzel.

16. A dough-stick forming machine comprising a stationary support for the stick, grippers for the ends of the stick, means for first swinging the grippers in intersecting arcs and means for individually varying the elevations of the grippers during the swinging movement to form the ends of the stick into side loops, and means for attaching the ends of the stick to the body thereof at the termination of the swinging movements of the grippers.

17. A dough-stick forming machine comprising a stationary support for the stick, means for cutting the stick to predetermined length, grippers for the ends of the stick, means for first swinging the grippers in intersecting arcs and means for raising and lowering the grippers independently during the swinging movement to form the ends of the stick into side loops, and means for attaching the ends of the stick to the body thereof at the termination of the swinging movements of the grippers.

18. A dough-stick forming machine comprising a stationary support for the stick, arms, grippers carried by said arms and movable into position to seize the ends of the stick, means for moving the arms toward one another and raising one arm so as to cause its end to pass over the other end of the stick, and means to attach the ends of the stick to the body thereof at the end of the movement of each arm.

19. In a machine for manipulating dough sticks, means for positioning the dough-stick, grippers, means to move the grippers into engagement with the ends of the stick and for actuating the grippers to seize the stick, swinging supports for the grippers and means to move the supports so that the grippers travel in intersecting arcs to cause the ends of the stick to cross, means acting in timed relation for attaching one end of the stick to the body thereof, and then elevating the other end of the stick passing it over the first-named end and attaching it to the body of the stick.

20. In a machine for manipulating dough sticks, means for positioning the dough-stick, grippers, means to move the grippers into engagement with the ends of the stick and for actuating the grippers to seize the stick, swinging supports for the grippers and means to move the supports so that the grippers travel in intersecting arcs to cause the ends of the stick to cross, and means acting in timed relation for attaching one end of the stick to the body thereof while the other end of the stick is stationary, and then elevating the other end of the stick passing it over the first-named end and attaching it to the body of the stick.

21. In a machine for tying dough sticks, the combination of means for supplying sticks of dough to the point of use, means for automatically gripping the ends of the stick of dough, means for manipulating said gripping means so as to tie the end portions of the stick into a pretzel, said manipulating means including a plurality of sets of co-axially disposed shafts and arms carried thereby capable of independent movement for automatically moving said gripping means inwardly toward each other and including also means for automatically varying the elevation of said gripping means during the course of such movement so as to permit the end portions of the stick to be tied together into pretzel form.

22. In a machine for tying dough sticks, the combination of means for supplying sticks of dough to the point of use, means for automatically gripping the ends of the stick of dough, means for manipulating said gripping means so as to tie the end portions of the stick into a pretzel, said manipulating means including a plurality of sets of co-axially disposed shafts and irregularly shaped arms carried thereby capable of independent movement for automatically moving said gripping means inwardly and around each other and including also means for automatically varying the elevation of said gripping means during the course of such movement so as to permit the end portions of the stick to be tied together into pretzel form.

EARL W. CURTIS.